(12) United States Patent
Oedekoven et al.

(10) Patent No.: US 8,215,265 B2
(45) Date of Patent: Jul. 10, 2012

(54) ANIMAL COMPARTMENT ASSEMBLY

(76) Inventors: Jason W. Oedekoven, Recluse, WY (US); James D. Heald, Recluse, WY (US)

( * ) Notice: Subject to any disclaimer, the term of this patent is extended or adjusted under 35 U.S.C. 154(b) by 378 days.

(21) Appl. No.: 12/542,018

(22) Filed: Aug. 17, 2009

(65) Prior Publication Data
US 2011/0036302 A1 Feb. 17, 2011

(51) Int. Cl.
*A01K 1/02* (2006.01)
(52) U.S. Cl. ......................... 119/482; 119/454; 119/475
(58) Field of Classification Search .................. 119/452, 119/454, 456, 464, 475, 482
See application file for complete search history.

(56) References Cited

U.S. PATENT DOCUMENTS

| | | | |
|---|---|---|---|
| 2,009,758 A | 7/1935 | Blatchford | |
| 2,523,762 A * | 9/1950 | Howard | 119/63 |
| D200,298 S | 2/1965 | Daniel | |
| 3,237,599 A | 3/1966 | Torrey et al. | |
| 3,477,408 A | 11/1969 | Mull | |
| 3,718,120 A | 2/1973 | Schwarz et al. | |
| D237,283 S | 10/1975 | Evans | |
| D257,493 S | 11/1980 | Lodrick | |
| 4,252,082 A | 2/1981 | Herring | |
| 4,347,807 A * | 9/1982 | Reich | 119/499 |
| 4,384,547 A * | 5/1983 | Mattox | 119/464 |
| 4,722,300 A | 2/1988 | Walker et al. | |
| 5,081,956 A | 1/1992 | Greitzer et al. | |
| D340,551 S | 10/1993 | Mitchell, Sr. | |
| 5,431,129 A | 7/1995 | Clark | |
| 5,467,735 A | 11/1995 | Chrisco | |
| 5,694,886 A * | 12/1997 | Hauck | 119/497 |
| 5,727,501 A | 3/1998 | York | |
| 5,746,271 A | 5/1998 | DeCosta | |
| 6,202,594 B1 | 3/2001 | Kirschner | |
| 6,490,995 B2 | 12/2002 | Greene, Jr. | |
| 6,701,866 B1 | 3/2004 | Shieh | |
| 7,051,675 B1 | 5/2006 | Mayer et al. | |
| 7,152,550 B2 | 12/2006 | Walker | |
| 2002/0100427 A1 | 8/2002 | Notenbomer | |
| 2005/0241593 A1 | 11/2005 | Kaura | |
| 2006/0054102 A1 * | 3/2006 | Hailey | 119/482 |
| 2006/0236952 A1 | 10/2006 | King | |
| 2007/0000449 A1 * | 1/2007 | Martin | 119/484 |
| 2007/0193522 A1 | 8/2007 | Greschler | |
| 2008/0230011 A1 * | 9/2008 | Michels | 119/500 |
| 2009/0223463 A1 * | 9/2009 | Chem | 119/482 |

* cited by examiner

*Primary Examiner* — Kimberly Berona
(74) *Attorney, Agent, or Firm* — Zarley Law Firm, P.L.C.

(57) ABSTRACT

An animal compartment assembly that has a roof that is supported by a sidewall. The sidewall has a door therein that is slidably within the sidewall. A floor supports the sidewall to complete the structure. There is a storage chamber that is disposed within the sidewall and has a door that opens to provide access to the storage chamber from outside the sidewall wherein items for the animal can be stored.

15 Claims, 7 Drawing Sheets

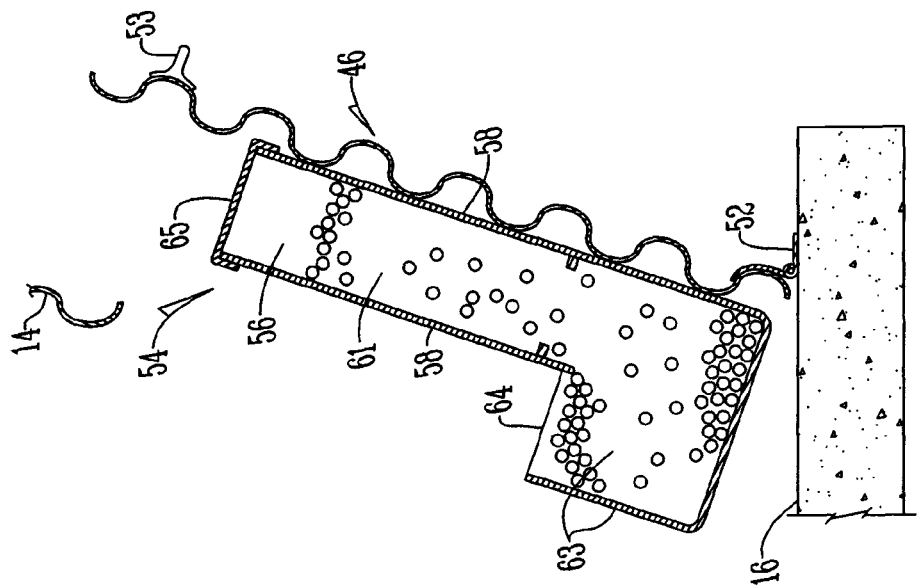
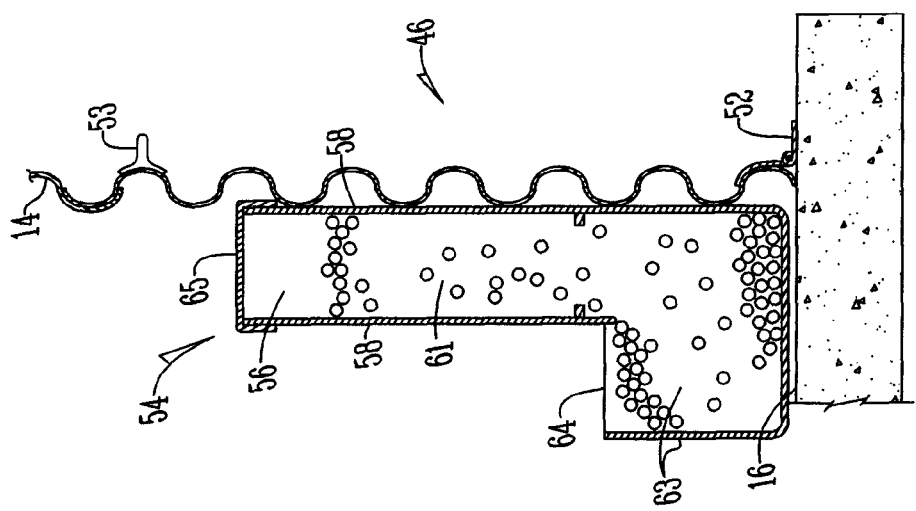

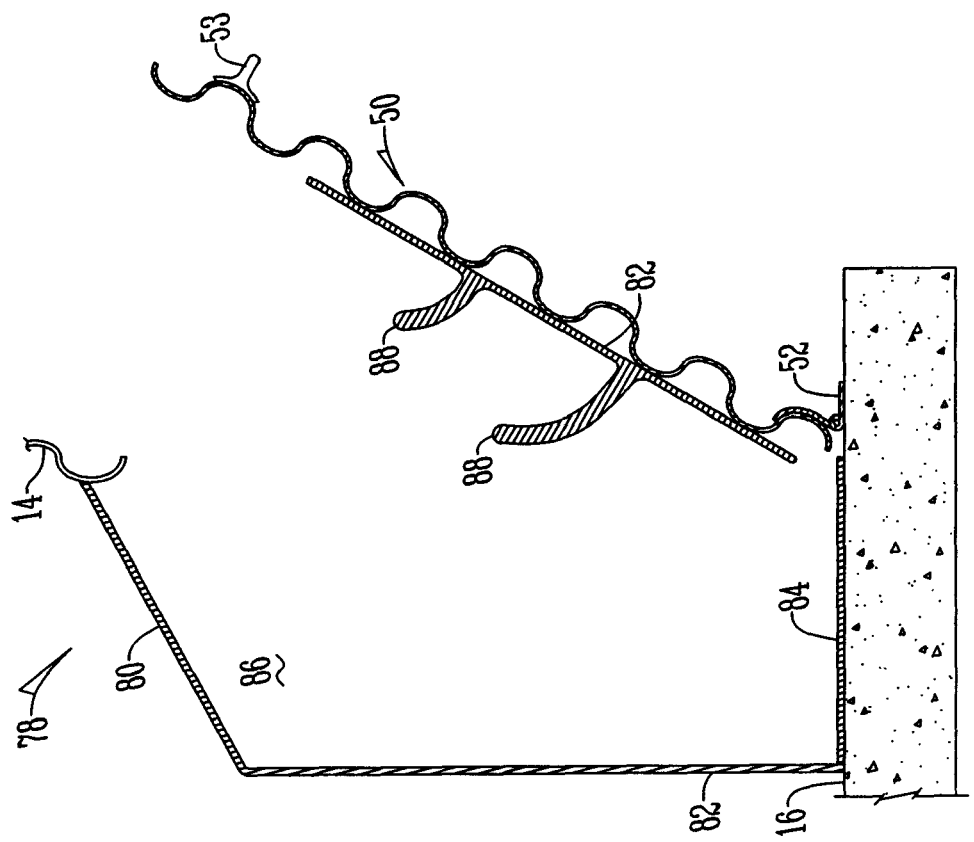
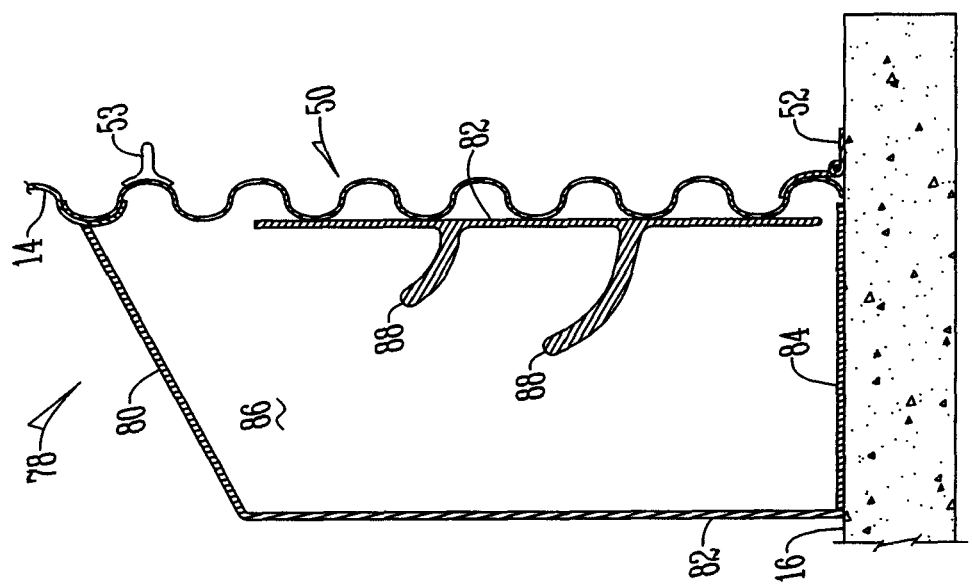

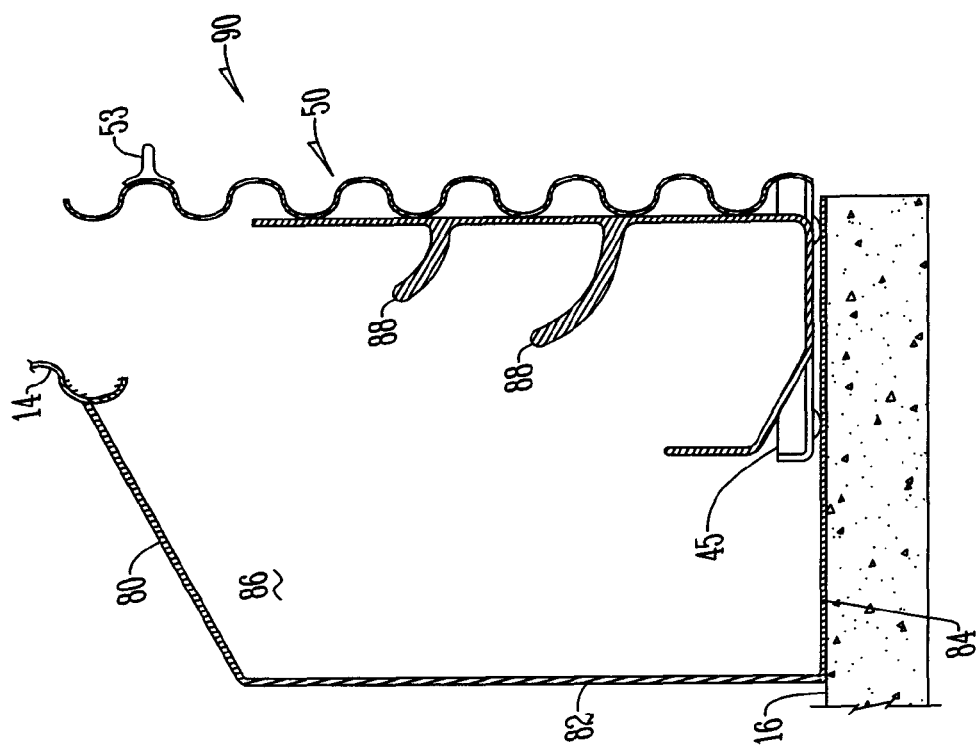
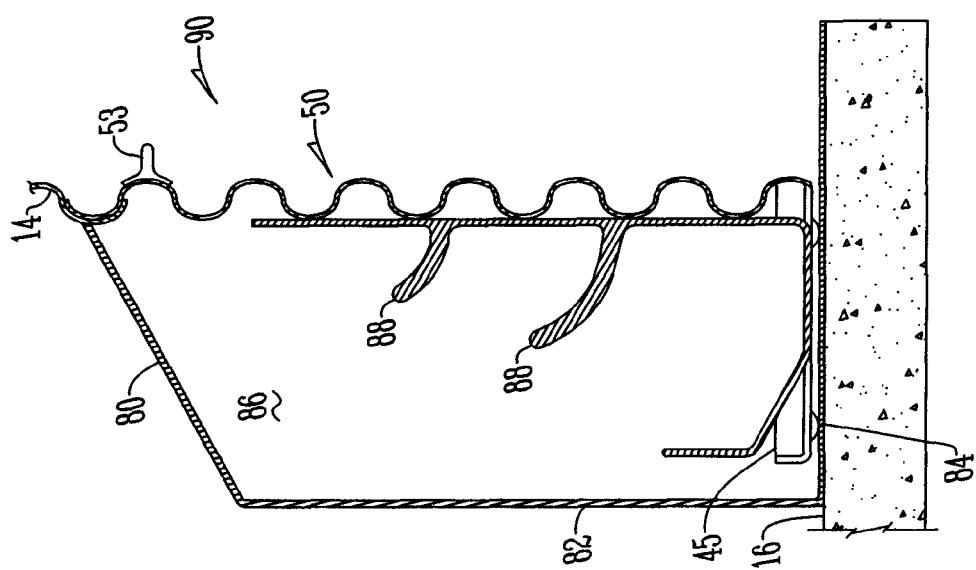

ANIMAL COMPARTMENT ASSEMBLY

BACKGROUND OF THE INVENTION

This invention is directed to an animal compartment and more specifically, this invention is directed to an all inclusive animal compartment.

Animal compartments are well known in the art and are used to house animals and protect them from adverse weather conditions such as cold temperatures and precipitation. While these animal compartments provide shelter for the dog, they often provide the bare minimum to care for an animal's life. Additionally, these animal compartments require daily maintenance by the animal's caretaker to provide food and water to the animal.

Typically, because these animal compartments contain the bare minimum to care for an animal, they are inconvenient and add additional time to care for an animal as food, drugs, and water are not readily available. Therefore a need exists in the art for a device that addresses these deficiencies.

Thus, an object of this invention is to provide an animal compartment that is more convenient to use.

Another object of the present invention is to provide an animal compartment with storage capacity so that care items are readily available.

These and other objects, features, or advantages of the present invention will become apparent from the specification and claims.

BRIEF SUMMARY OF THE INVENTION

An animal compartment having a roof, sidewall, and floor that form a hollow chamber. The sidewall has a plurality of doors that provide access to the hollow interior. Associated with one door is a food compartment, associated with a second door is a water device, and associated with a third door is a storage compartment.

BRIEF DESCRIPTION OF THE DRAWINGS

FIG. 4 is a side sectional view of a food door in a closed position;

FIG. 4A is a side sectional view of a food door in an open position;

FIG. 6 is a side sectional view of a storage door in a closed position;

FIG. 6A is a side sectional view of a storage door in an open position;

FIG. 7 is a side sectional view of a storage door in a closed position; and

FIG. 7A is a side sectional view of a storage door in an open position.

DETAILED DESCRIPTION OF THE PREFERRED EMBODIMENTS

Figure 1:
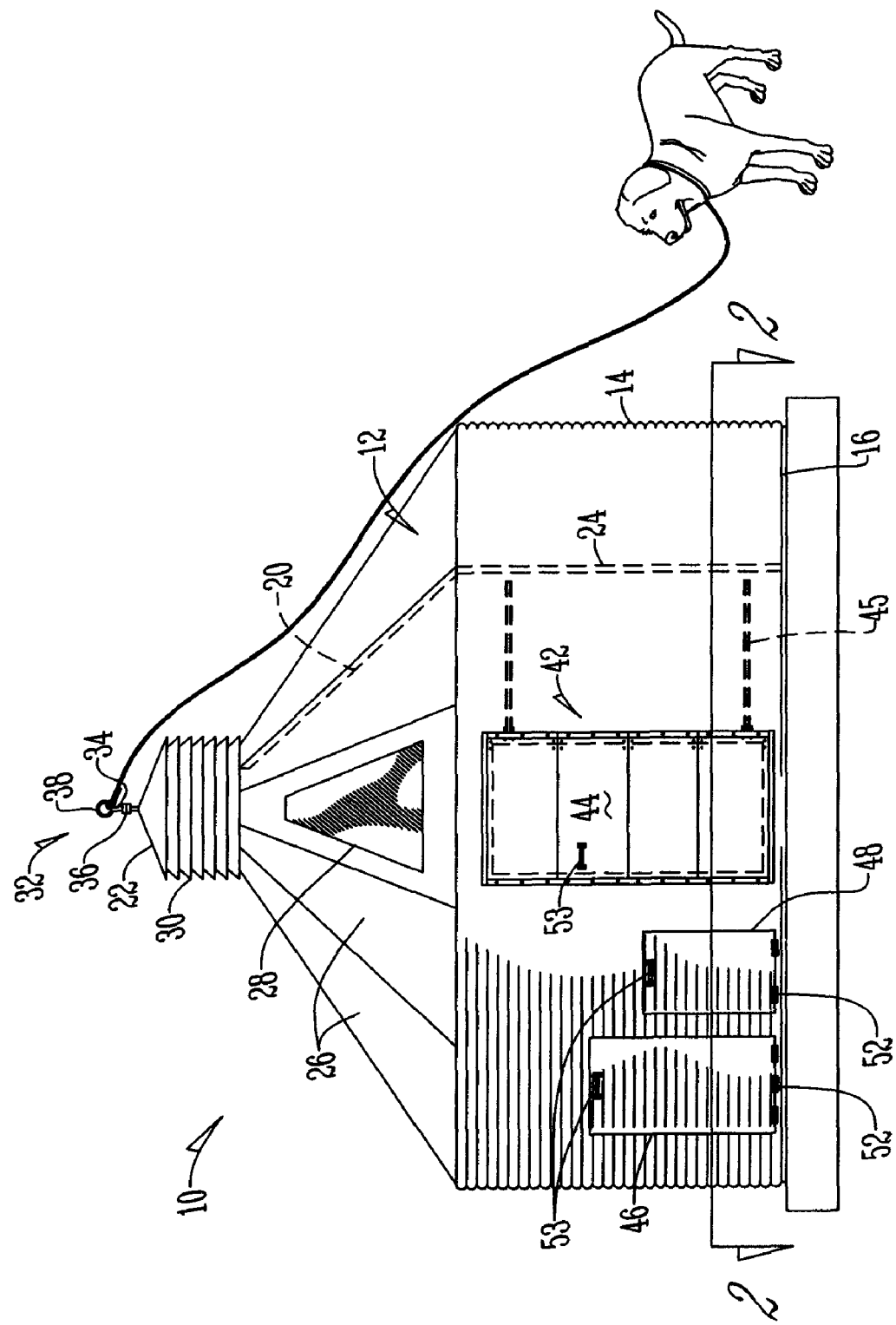
FIG. 1 is a side plan view of an animal compartment assembly.
Figure 2:
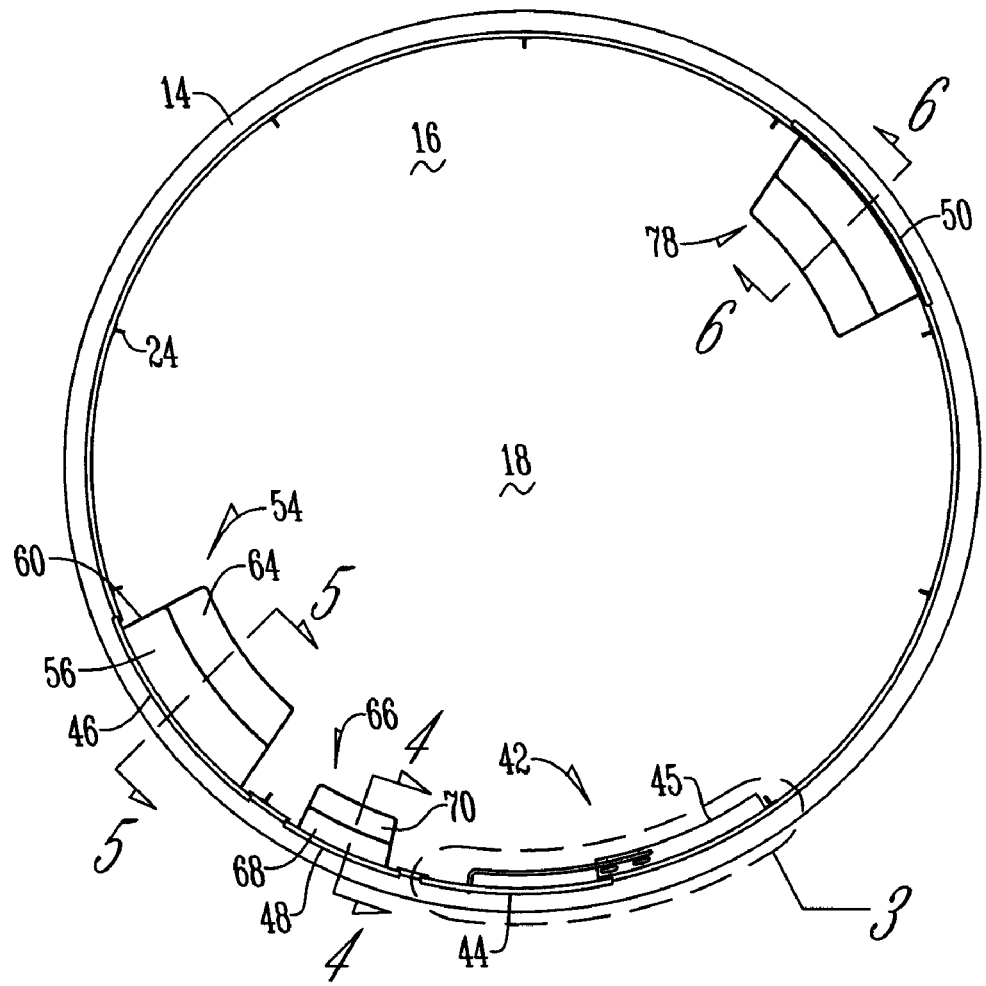
FIG. 2 is a top plan view of an animal compartment assembly wherein the roof has been removed.
Figure 3:
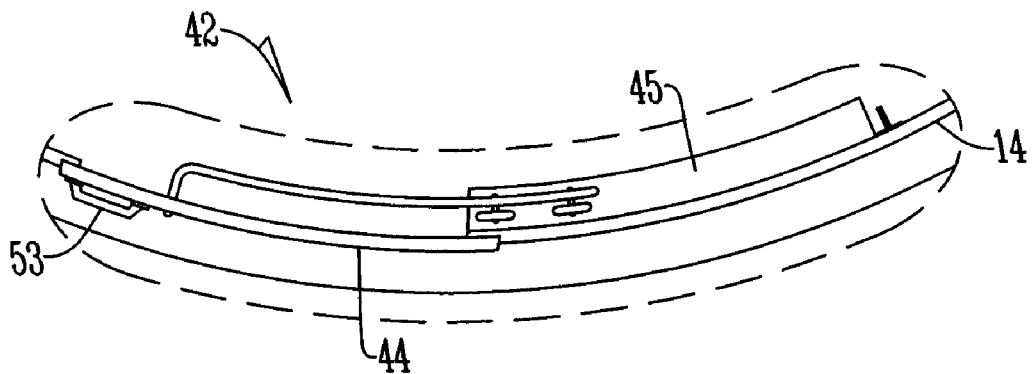
FIG. 3 is a partial top plan view of a door in a closed position.
Figure 3A:
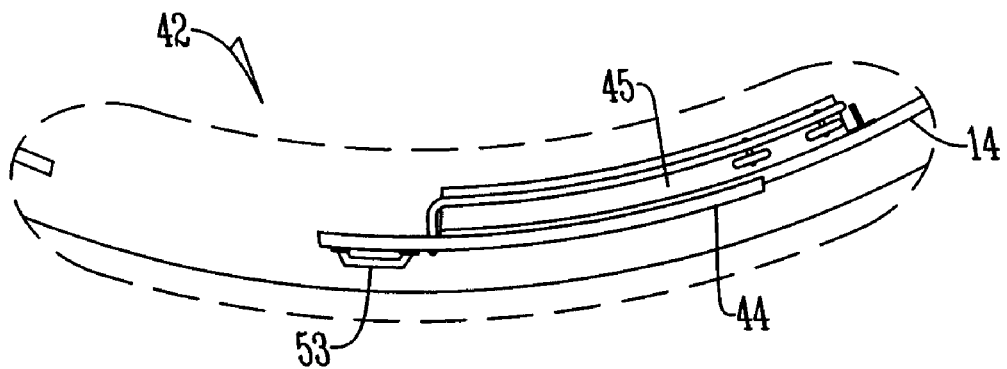
FIG. 3A is a partial top plan view of a door in an open position.
Figure 5A:
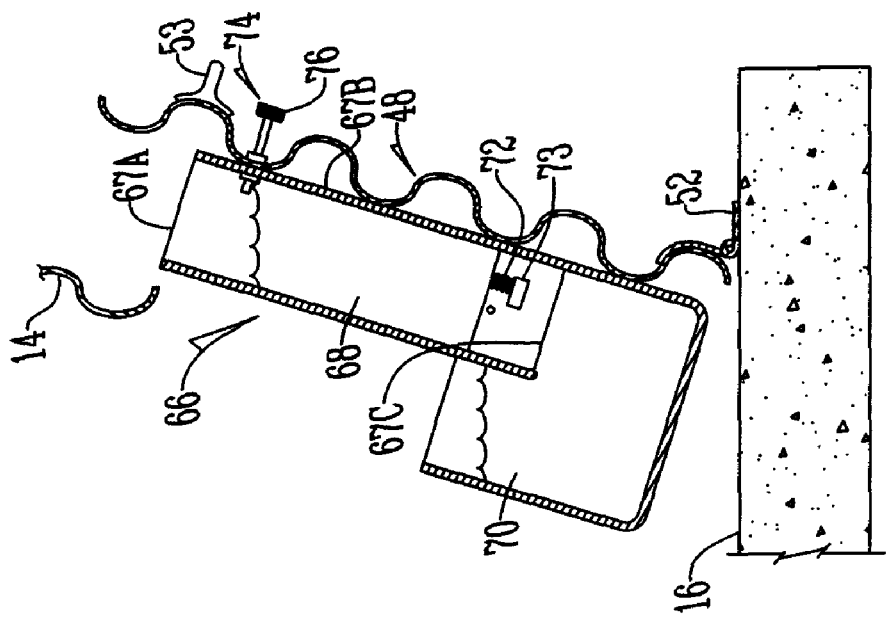
FIG. 5A is a side sectional view of a water door in an open position.
Figure 5:
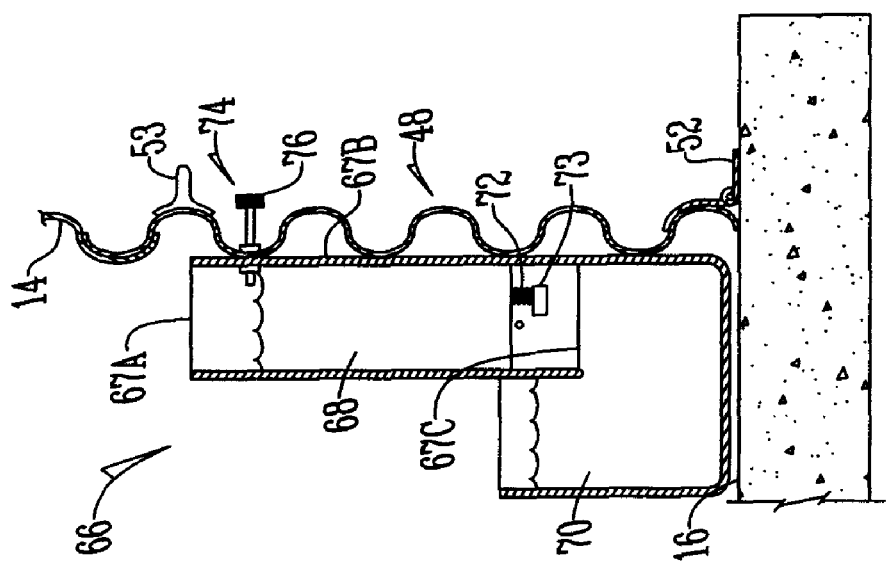
FIG. 5 is a side sectional view of a water door in a closed position.

An animal compartment 10 having a roof 12, a sidewall 14 and a floor 16 that form a hollow chamber 18. As one example, the roof 12 includes a plurality of struts 20 which form a strut network to support roof 12. Struts 20 are connected to the sidewall 14 at a first end and are connected to a central member 22 at a second end. Alternatively, struts 20 are connected to a frame member 24 which extends downwardly at a first end of the strut 20. A plurality of panels 26 are connected to struts 20. Panels 26 extend at a slightly downward pitch from central member 22 towards sidewall 14. At least one window 28 is positioned within a panel 28 which is made of a transparent or translucent material which allows light to pass therethrough to illuminate hollow chamber 18. Alternatively, panel 26 is constructed of a transparent or translucent material. At least one vent 30 is connected to roof 12. Vent 30 is preferably integral with central member 22 and is adjustable between an opened or closed position to allow air to flow into the hollow chamber 18. Vent 30 is any form such as a square roof vent, a roof cap, a turbine roof vent, louvers, or the like.

Connected to and extending upwardly from the central member 22 is lift member 32. The lift member 32 has a shaft 34, a bearing 36 which allows for rotation, and an I-bolt portion 38 for attachment to a leash, cable, chain or the like. Alternatively, lift member 32 is connected to any portion of roof 12. Lift member 32 also functions as a hard-point to connect the animal compartment 10 to lift, move and place the animal compartment 10. Additionally, an I-bolt portion 38 is connected to the interior of the roof 12.

Sidewall 14 is made of at least one piece, preferably arcuate in shape, or is made of several pieces forming any shape such as a square or rectangle. Sidewall 14 extends downwardly in vertical fashion in relation to the roof 12 at a top edge, to the floor 16 at a bottom edge. Sidewall 14 has at least one opening 42 which allows access to the hollow chamber 18. Opening 42 is covered by a door 44. Door 44 is preferably slidably connected to a rail 45 mounted to sidewall 14.

Sections of the sidewall 14 are cut to form a food door 46, water door 48, and a storage door 50 and are connected to the floor 16 by an conventional means such as a sliding rail, a drawer, a removable attachment such as a clip or the like. Preferably, the doors 46, 48 and 50 are hingedly connected to floor 16 or sidewall 14 by hinge 52 and have a handle 53 attached thereto.

Feeding compartment 54, which is connected to the feeding door 46 or sidewall 14 has an open top 56, sidewalls 58, and a bottom 60 that form a food compartment 61. The food compartment 61 has a food storage section 62 and a feeding section 63 that are in communication with one another. The feeding section 63 has an opening 64 that permits access to the feeding section 63 by the animal. A resealable top 65 is formed to fit the open top 56.

A watering device 66, which is connected to the water door 48 or sidewall 14, has a top 67A, a sidewall 67B, and a bottom 67C that form a water storage chamber 68. The water storage chamber 68 is in fluid communication with a water dish 70 through an opening sealed by valve 72. Valve 72 is of any type that permits flow of water from chamber 68 to dish 70 and preferably has an activation device 73 that permits flow when the water level in dish 70 reaches a predetermined level. Water is supplied to the watering device 66 from a pressurized source through a spigot 74 that preferably extends through sidewalls 14 and 67B. In one example, the spigot 74 has a conventional attachment 76 such as a hose attachment or the like.

Storage compartment 78 has a top wall 80, a plurality of sidewalls 82 and bottom wall 84 which define a hollow interior chamber 86. Connected to sidewalls 82, and preferably extending therebetween, are shelves 88 which define separated areas for the separation and storage of animal related items within the storage compartment 78 such as extra food, toys, medicines, leashes, brushes, tools, bedding and the like. Preferably, shelves 88 define separated areas of varying size so as to accommodate both large bulky items, such as bags of food or bedding, and small items such as brushes and leashes. Alternatively, shelves 88 are connected to the interior side of storage door 50. In another embodiment, storage compartment 78 is placed on a sliding drawer-type assembly 90 such that as the handle 53 connected to the storage door 50 is pulled; drawer-type assembly 90 slidably pulls out from animal compartment 10 providing access to storage compartment 78.

The floor 16 is of any type known in the art. Preferably floor 16 contains a heating element so as to warm the animal compartment 10.

In operation, a user connects one end of a leash, cable, chain or any other attachment device to the I-bolt portion 38 of lift member 32 and the opposing end to an animal. By way of the position of lift member 32 being above roof 12 and the rotating abilities of bearing 36 the animal has the ability to walk all the way around animal compartment 10. To allow the animal to access the hollow chamber 18 the user opens door 44 which slides upon rail 45. To restrict the animal to the hollow chamber, the user places the animal within the hollow chamber 18 and closes door 44 behind the animal.

To allow ventilation of the hollow chamber 18 the user adjusts vents 30 to a desired open position. Alternatively, to restrict airflow to the hollow chamber 18 the user adjusts vents 30 to a closed position.

To fill the feeding compartment 54 the user opens food door 46 by way of handle 53. In a preferred embodiment the food door 46 rotates outwardly upon hinge 52 positioned at the bottom of food door 46 thereby exposing feeding device 54. The user then removes the resealable top 58 and fills the food storage chamber 56 with a bulk portion of food. As the animal consumes food from food dish 64, food contained within storage chamber 56 migrates downwardly by the force of gravity, through the opening in bottom 62, and into food dish 64.

Similarly, to access the watering device 66 the user opens water door 48 by way of handle 53. In a preferred embodiment the water door 48 rotates outwardly upon hinge 52 positioned at the bottom of water door 48 thereby exposing watering device 66. The user then fills the watering device 66 through the top of the water storage chamber 68. Alternatively, the user fills the water storage chamber 68 through spigot 74 by pouring water down spigot 74 or by way of attaching a hose to conventional attachment 76.

To access the storage compartment 78, the user opens the storage door 50 by way of handle 53. In a preferred embodiment the storage door 50 rotates outwardly upon hinge 52 positioned at the bottom of storage door 50 thereby providing the user with access to storage compartment 78. Alternatively, as the user pulls on handle 53 the storage door pulls out upon a drawer-type arrangement 90 thereby providing the user with access to storage compartment 78. In this way the user removes and replaces animal related items upon shelves 88 within the hollow interior chamber 86 of the storage compartment 78.

From the above discussion it will be appreciated that the all inclusive animal compartment 10 described above improves upon prior art animal houses, is more convenient to use, and provides storage for ready access. Therefore, the all inclusive animal house described above achieves all of the above stated objectives.

It will be appreciated by those skilled in the art that other various modifications could be made to the device without parting from the spirit and scope of this invention. All such modifications and changes fall within the scope of the claims and are intended to be covered thereby.

What is claimed is:

1. An animal compartment assembly comprising:
a roof;
a sidewall connected to and supporting the roof;
a floor supporting the sidewall;
wherein the roof, sidewall, and floor form a hollow interior chamber on an inside of the sidewall and the sidewall has an opening which allows access for the animal to enter into the hollow interior chamber; and
one or more compartments disposed within the hollow interior chamber, said compartments comprising at least one of a feeding device or a watering device, each said compartment connected to a door formed in the sidewall wherein the door is connected to the floor by a hinge that opens to provide access to the compartment from outside the sidewall.

2. The assembly of claim 1 wherein one of the compartments is a food compartment containing the feeding device and the door connected to the food compartment rotates outwardly from the hollow interior chamber and sidewall upon the hinge positioned at a bottom of the door to provide access to the feeding device from outside the sidewall.

3. The assembly of claim 2 wherein one of the compartments is a storage compartment and the door connected to the storage compartment rotates outwardly from the hollow interior chamber and sidewall upon the hinge positioned at a bottom of the door to provide access to shelves within an interior chamber of the storage compartment from outside the sidewall.

4. The assembly of claim 3 wherein one of the compartments is a water compartment containing the watering device and a door connected to the water compartment rotates outwardly from the hollow chamber and sidewall upon a hinge positioned at a bottom of the door to provide access to the watering device from outside the sidewall.

5. The assembly of claim 4 wherein the watering device is fluidly connected to a source of pressurized water.

6. The assembly of claim 4 wherein the watering device comprises a removable water storage container that holds and heats water.

7. The assembly of claim 6 wherein a valve is disposed between the removable water storage container and a water dish that automatically fills the water dish.

8. The assembly of claim 2 wherein the feeding device has a food storage chamber for storing a bulk amount of food and a resealable top for resealing the food storage chamber.

9. The assembly of claim 8 further comprising a food dish in communication with the food storage chamber to receive food stored within the food storage chamber.

10. The assembly of claim 1 further comprising a storage door cut from a section of the sidewall and a storage compartment within the hollow interior chamber and connected to the storage door wherein the storage door and storage compartment are connected to the floor by a rail to provide access to the storage compartment from outside the sidewall.

11. The assembly of claim 10 wherein the storage compartment has a top wall, a plurality of sidewalls, and a bottom wall which define a hollow storage chamber having shelves connected to at least one of the plurality of sidewalls of the storage compartment.

12. The assembly of claim 1 wherein the floor is a heated floor.

13. The assembly of claim 2 wherein the roof comprises a plurality of struts and panels surrounding a central member.

14. The assembly of claim 13 wherein a vent is disposed within the central member.

15. The assembly of claim 13 wherein a lifting member is connected to the roof and has a shaft, a bearing that allows rotation, and an I-bolt that receives a leash.

* * * * *